US008475090B2

(12) United States Patent
Mergenthaler et al.

(10) Patent No.: US 8,475,090 B2
(45) Date of Patent: Jul. 2, 2013

(54) DRILL WITH A CENTERING DRILL INSERT, AND A METHOD OF USING A DRILL WITH A CENTERING DRILL INSERT, AND THE INSERT THEREFOR

(75) Inventors: Peter Karl Mergenthaler, Markt Bibart (DE); Berthold Heinrich Zeug, Fürth (DE); Horst Manfred Jaeger, Nürnberg (DE)

(73) Assignee: Kennametal Inc., Latrobe, PA (US)

( * ) Notice: Subject to any disclaimer, the term of this patent is extended or adjusted under 35 U.S.C. 154(b) by 1310 days.

(21) Appl. No.: 12/206,358

(22) Filed: Sep. 8, 2008

(65) Prior Publication Data

US 2009/0071723 A1 Mar. 19, 2009

Related U.S. Application Data

(63) Continuation-in-part of application No. PCT/EP2007/001798, filed on Mar. 2, 2007.

(30) Foreign Application Priority Data

Mar. 9, 2006 (DE) .......................... 10 2006 010 856

(51) Int. Cl.
*B23B 51/02* (2006.01)
(52) U.S. Cl.
USPC ........... 408/1 R; 408/231; 408/223; 408/713; 407/113
(58) Field of Classification Search
USPC .................................. 408/223, 224; 407/113
See application file for complete search history.

(56) References Cited

U.S. PATENT DOCUMENTS

| 4,210,406 A | * | 7/1980 | Berry, Jr. ....................... 408/223 |
| 4,297,058 A | | 10/1981 | Armbrust et al. |
| 5,688,083 A | | 11/1997 | Boianjiu |
| 6,200,077 B1 | * | 3/2001 | Svenningsson et al. ...... 408/230 |

FOREIGN PATENT DOCUMENTS

DE 694 16 248 6/1999

(Continued)

OTHER PUBLICATIONS

Japanese Patent Office, "Notice of Reasons for Rejection", (English translation of Notice), Jan. 31, 2012, 2 pp.

(Continued)

*Primary Examiner* — Eric A Gates
*Assistant Examiner* — Paul M Janeski
(74) *Attorney, Agent, or Firm* — Larry R. Meenan, Esq.

(57) ABSTRACT

An insert includes a body portion and at least one cutting edge disposed on the periphery thereof. The cutting edge includes an inner lip and an outer lip disposed at an angle with respect to one another. A line extending along the inner lip intersects with a line extending along the outer lip at the vertex of the angle. The angular cutting edge further includes a protuberance disposed between, and connecting the inner and outer lips and projecting outwardly away from the body portion beyond the vertex of the angle defined by the intersection of the lines extending from the inner and outer lips. The protuberance having an inner lip connected to the inner lip of the cutting edge and an outer lip connected to the outer lip of the cutting edge to form smooth curvilinear transitions between the lips of the protuberance and the lips of the cutting edge.

13 Claims, 5 Drawing Sheets

FOREIGN PATENT DOCUMENTS

| | | |
|---|---|---|
| EP | 0 133 168 | 2/1985 |
| GB | 2 016 316 | 9/1979 |
| JP | 60-71105 A | 4/1985 |
| JP | 7-509667 A | 10/1995 |
| JP | 10-193213 A | 7/1998 |
| JP | 10180519 A * | 7/1998 |
| JP | 2001269808 A * | 10/2001 |

OTHER PUBLICATIONS

International Search Report PCT/EP2007/001798 and English translation thereof, 2007.
Abstract of DE 694 16 248, Jun. 10, 1999, Iscar Ltd.

* cited by examiner

DRILL WITH A CENTERING DRILL INSERT, AND A METHOD OF USING A DRILL WITH A CENTERING DRILL INSERT, AND THE INSERT THEREFOR

CONTINUING APPLICATION DATA

This application is a Continuation-In-Part application of International Patent Application No. PCT/EP2007/001798, filed on Mar. 2, 2007, which claims priority from Federal Republic of Germany Patent Application No. DE 10 2006 010 856.6, filed on Mar. 9, 2006. International Patent Application No. PCT/EP2007/001798 was pending as of the filing date of this application. The United States was an elected state in International Patent Application No. PCT/EP2007/001798.

BACKGROUND

1. Technical Field

The application relates to a cutting insert for a drill according to at least one possible embodiment disclosed herein. The application further relates to a cutting insert designed as a single or double-sided indexable tip. Such indexable tips have, for example, a triangular, tetragonal, such as a square, pentagonal or hexagonal outline. The edges located between the corners are formed as cutting edges. The indexable tip is arranged in the insert seat of a drilling tool or a cassette to be inserted into a drilling tool in such a way that one of the edges cuts during the drilling operation, while the other edges lie inactive in the insert seat. After the active cutting edge has worn out, the indexable tip is simply released from the insert seat and indexed such that one of the formerly inactive cutting edges is now active, i.e. the next drilling operations are carried out with it. This rotation of the indexable tip in the insert seat is effected until all edges of the indexable tip have been used up and thus the entire indexable tip has worn out.

2. Background Information

Background information is for informational purposes only and does not necessarily admit that subsequently mentioned information and publications are prior art.

Furthermore, it is known to arrange several indexable tips in a drilling tool. Often the indexable tips are made of carbides. When several indexable tips are applied, for example two or more, the indexable tips are arranged on the drill in such a way that they together form the major cutting edge of the drill. Configurations are also known in which the indexable tips are arranged on the major cutting edge with an offset to each other.

That means that with the indexable tips, it is possible to substitute one or several cutting edges of the drill through indexable tips.

When talking about cutting inserts in the following, the statements refer to a cutting insert with one cutting edge. Of course, the indications made with regard to the cutting insert can at any time also be applied to an indexable tip, which differs—as mentioned before—from the single-edged insert by the fact that one insert possesses several cutting edges at a time. Cutting inserts are known in which the cut is distributed at the drill-hole bottom to an even number of cutting edges. With these tools, half of the cutting edges machine the drill-hole bottom in the area of the drill-hole center, whereas the other half of the cutting edges machine the area of the drill-hole bottom which faces towards the outer diameter. This distribution of cut leads to a division of the cutting forces. In this way, an inner lip and an outer lip are formed on each cutting insert. These inner and outer lips may be located at an angle to each other, i.e. they may form an angular cutting edge comprising an inner lip and an outer lip. For certain applications, a degenerated angular cutting edge can also be used, in which the outer and inner lips are oriented to each other at an angle of 180°. In this case, the cutting insert is arranged in the insert seat in such a way that the cutting edge obliquely engages the workpiece to be machined.

Ideally, the inner and outer lips are proportioned relative to each other in such a way that a unilateral drifting of the tool relative to the drilling axis is restricted or minimized. Due to the work tolerances inevitable in tool manufacture, it is, however, hardly possible in practice to manufacture a cutting insert in such a way that the above-mentioned unilateral drifting of the tool is completely excluded. The use of several cutting inserts entails, furthermore, the problem that the tolerance faults, in the worst case, add up, resulting in an increased tendency to drifting of the tool. Due to the antipenetration cutting force component, which is then effective, the drilling tool runs in an unstable manner during application, which will result in a poor drill-hole quality and an early failure of the tool.

It is true that the described angular or roof-shaped arrangement of inner and outer lips relative to each other already improves the drifting behavior. To minimize or restrict the drifting of the tool, it is often desirable to keep the angle formed by the inner and outer lips as acute as possible. This entails, however, an unfavorable chip shape. Furthermore, it enlarges the engagement length of the cutting edge, which, in turn, leads to an undesired increase of the cutting forces and to an enlargement of the depth of the first cut. From DE-T-694 16 248, an indexable tip is known, in which the outer and the inner lips are divided into two partial lips with different angles, so that on this cutting insert, pre-lips are arranged in front of the cutting edges properly speaking, in the manner of a plunging tool. However, this arrangement of the cutting edges results in an undesired chip shape, namely ribbon chips.

OBJECT OR OBJECTS

In view of these disadvantages, at least one embodiment of the present application is based on the task to improve the drifting behavior of a drill with a cutting insert. This task may be solved by a cutting insert for a drill with at least one inner lip and one outer lip, forming the sides of an angle of an angular cutting edge, wherein a pimple-shaped protuberance is provided at the vertex of the angle, and the lateral flanks of the protuberance each form a protuberance lip directly running into the inner lip and the outer lip, respectively.

SUMMARY

In at least one possible embodiment, the cutting insert includes an inner lip and an outer lip. These inner and outer lips form the sides of an angle, i.e. the cutting insert has an angular cutting edge. In the area of the vertex of the angle forming the cutting edge, a pimple-shaped protuberance is provided according to at least one possible embodiment. This protuberance additionally centers the cutting edge during the drilling operation. The protuberance has a very short length and essentially only covers the vertex of the angle formed by the inner and outer lips. Furthermore, the protuberance does not protrude very far from the cutting edge of the cutting insert. The protuberance serves in a way as a centering point for the cutting edge during the drilling operation. The essential cutting effort is still carried out by the inner lip on the one hand and the outer lip on the other hand, which are adjacent to the protuberance, while the protuberance, in addition to a cutting function, also has a centering function for the tool during the drilling operation. The centering function, in at least one possible embodiment, compensates for the drifting of the drill away from the center that occurs during drilling of a hole.

Furthermore, each lateral flank of the protuberance is formed by a protuberance lip. The inner protuberance lip adjacent to the inner lip directly runs into the inner lip, and the outer protuberance lip runs into the outer lip. That means that the transition between the two protuberance lips of the inner and outer lips is continuous and offset-free. Therefore, during the cutting operation, a continuous chip is formed over the entire cutting edge and the chip does not break in the transitional area between the protuberance lips and the inner and outer lips. In accordance with at least one possible embodiment, both the protuberance lips and the inner and outer lips form in each case a roof-shaped pair of lips including between them an angle smaller than 180°. In alternative embodiments, the inner and outer lips are arranged at an angle of 180° or at an angle larger than 180°, the protuberance lips being arranged in this case in a roof-shaped manner with an angle smaller than 180°. The protuberance lips, in accordance with at least one possible embodiment, may be straight or may be possibly curved.

In one possible embodiment, the interior angle between the inner protuberance lip and the outer protuberance lip is smaller than the angle between the inner lip and the outer lip. In this way, the inner and outer lips continue the course of the inner protuberance lip and the outer protuberance lip, respectively, in the form of a flat runout. In accordance with at least one possible embodiment, between the protuberance lips and the inner and outer lips, no change of direction takes place within the cutting edge, so that the cutting edge is completely undercut-free. Furthermore, no 90° angle exists within the cutting edge. Rather does the cutting edge have a continuous angular course with the protuberance in the area of the vertex point of the cutting edge.

In another possible embodiment, the area between the inner protuberance lip and the outer protuberance lip is rounded as a pimple-shaped projection.

A symmetric structure of the entire cutting edge is desirable in at least one possible embodiment. This allows an easy exchange of the insert and the use in both a left-hand and a right-hand tool. Thus, the entire cutting edge may be arranged symmetrically around the protuberance. The length of the inner lip may be, in accordance with at least one embodiment, identical to the length of the outer lip. The same applies to the protuberance lips, if provided.

In some applications, a symmetric structure results in an unbalanced introduction of forces into the cutting insert during the cutting operation. For such cases, an asymmetric structure may be provided, i.e. the cutting edges are of different length and/or designed with different inclinations, the asymmetry being chosen such that the forces acting upon the cutting insert during the cutting operation in radial direction, i.e. in the direction normal to the cutting direction, compensate each other so that no or virtually no resultant radial force acts upon the drill.

To make it possible to use the cutting insert in both left-hand and right-hand tools or to change the direction of rotation of the tool, a clearance may be arranged in the area of the flank allocated to the protuberance.

In at least one possible embodiment, it may be desirable—as mentioned above—to use a cutting tool with several cutting edges, designed as an indexable tip. The double function of the protuberance in an indexable tip may be advantageous. While the protuberance of the active cutting edge serves for the above-described improvement of the drilling behavior, the protuberance of an inactive cutting edge protrudes, with inserted indexable tip, into the corner hole which at least one possible embodiment, arranged between the insert bearing faces of the insert seat, thus preventing a jamming of chips in this corner hole. That means that the protuberance located in the corner hole serves as a filler for the corner hole.

In at least one possible embodiment, the drill has an inner cutting insert and an outer cutting insert. The inner cutting insert is located near the center of the drill and is designed to cut the center of the hole. The outer cutting insert is designed to cut the outer portion of the hole. The outer cutting insert may be of a different design than the inner cutting insert, in accordance with at least one possible embodiment. Alternatively, the outer cutting insert may possibly be of the same design as the inner cutting insert.

In at least one possible embodiment, the inner cutting insert comprises a protuberance or projection that is configured or designed to compensate for drill drift. During a cutting operation, the forces exerted on the outer cutting insert are such that the drill may have a tendency to wander or drift off of center, thereby causing an inaccurately drilled hole, such as a drill that is not straight or has sections of differing diameter. The protuberance of the inner cutting insert performs a centering function in order to compensate for the drill drift and promote a substantially straight hole having a consistent diameter throughout.

The above-discussed embodiments of the present invention will be described further hereinbelow. When the word "invention" or "embodiment of the invention" is used in this specification, the word "invention" or "embodiment of the invention" includes "inventions" or "embodiments of the invention", that is the plural of "invention" or "embodiment of the invention". By stating "invention" or "embodiment of the invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

DESCRIPTION OF EMBODIMENT OR EMBODIMENTS

Figure 1:
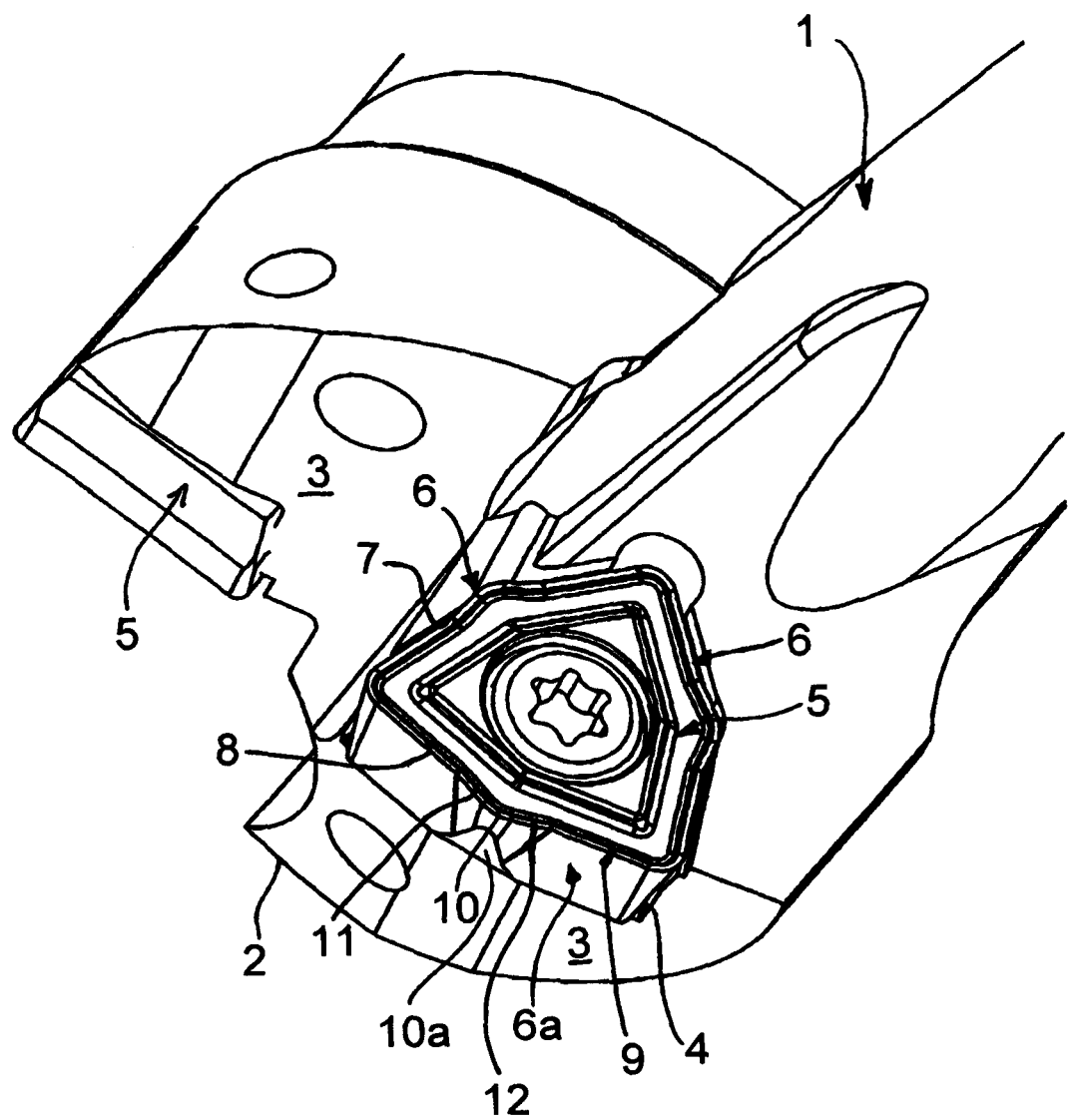
FIG. 1 shows the drilling point of a drilling tool with an inserted indexable tip.
Figure 2:
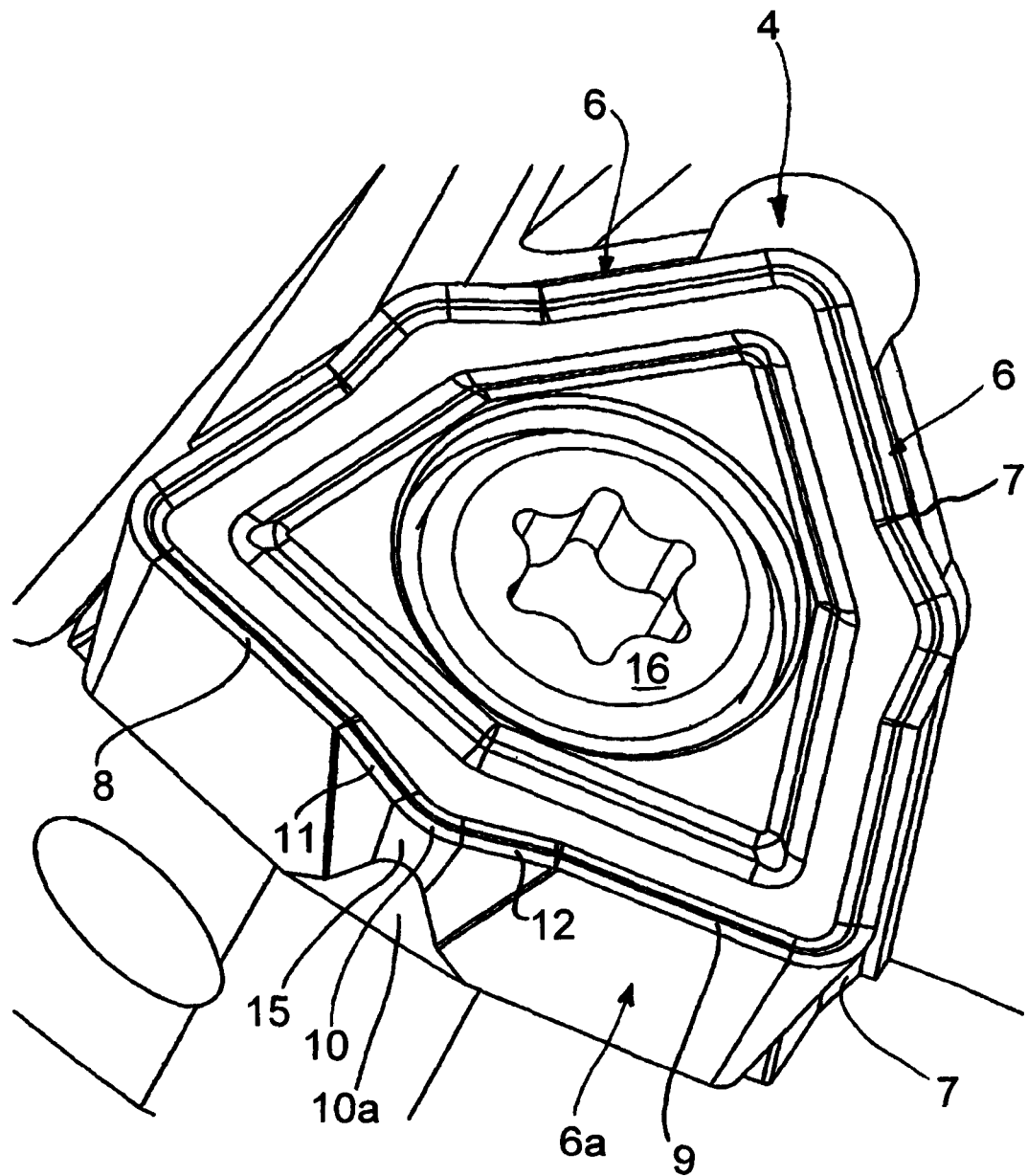
FIG. 2 shows the indexable tip in the insert seat of the drilling tool according to FIG. 1 in an enlarged representation.

The drill 1 has a drilling point 2. The front face of this drilling point 2 includes two main flanks 3. Each main flank 3 is adjacent to an insert seat 4 for receiving a cutting insert 5 designed as an indexable tip. The cutting insert 5 shown in FIGS. 1 and 2 has an almost triangular outline. Each side of this triangular outline acts as a cutting edge 6. Adjacent to the cutting edges 6, there are side faces 6A, with each of which the cutting insert 5 abuts on an insert bearing face 7 of the insert seat 4.

The cutting edge 6 not oriented towards the insert bearing faces 7 forms the active cutting edge of the cutting insert 5. The active cutting-edge of the cutting insert 5 is subdivided into an inner lip 8 and an outer lip 9. The protuberance 10 is arranged between the inner lip 8 and the outer lip 9. A clearance 10A formed in the manner of a recess is provided on the side face 6A below the protuberance 10.

The flanks of the protuberance 10 are effective as protuberance lips, so that the flank adjacent to the inner lip 8, of the protuberance 10, forms the inner protuberance lip 11 and the flank allocated to the outer lip 9, of the protuberance 10, forms the outer protuberance lip 12.

Figure 4:
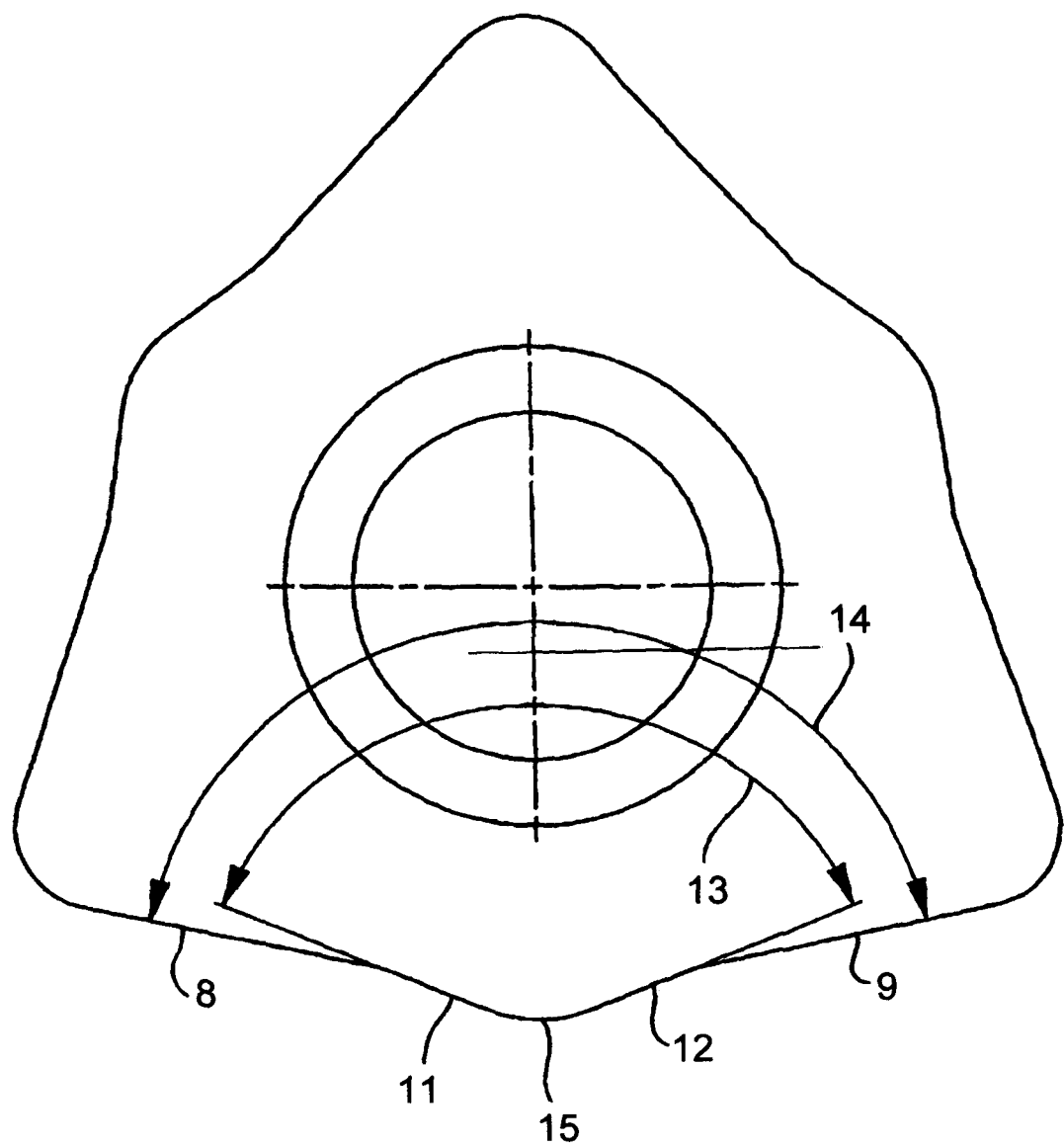
FIG. 4 is an outline sketch of the indexable tip according to at least one possible embodiment, with the angular relationships shown on the indexable tip.
Figure 5:
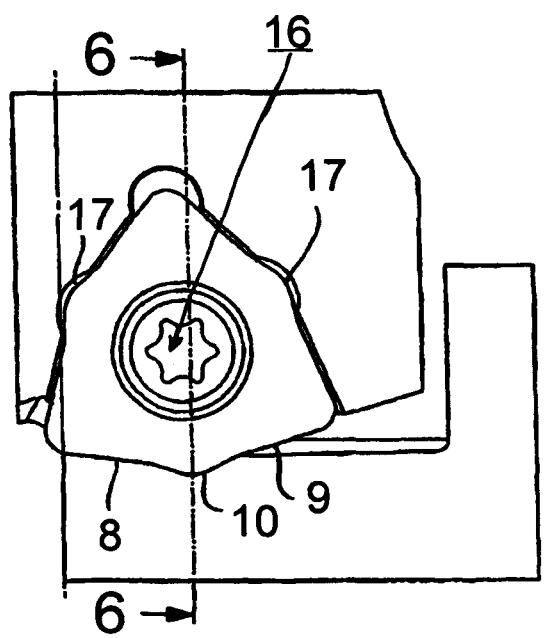
FIG. 5 shows an indexable tip located in an insert seat.
Figure 6:
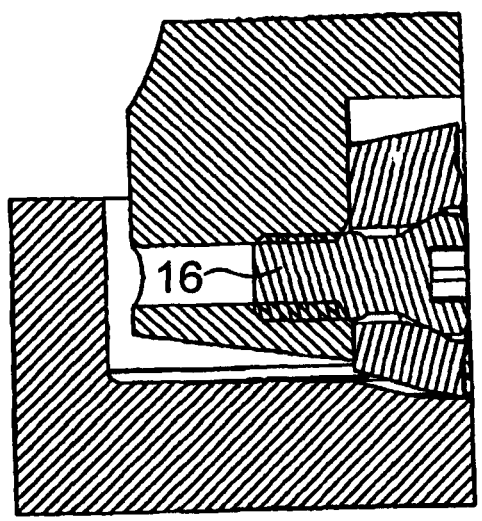
FIG. 6 shows a section through the indexable tip of FIG. 5.

From the representation of FIG. 4, it is evident that the interior angle 13 between the inner protuberance lip 11 and the outer protuberance lip 12 is smaller than the angle 14 included by the inner lip 8 and the outer lip 9 of the angular cutting edge 6. The interior angle 13 between the inner protuberance lip 11 and the outer protuberance lip 12 advantageously has a value between minimally 60° and maximally 170°. In the embodiment shown in FIG. 4, the interior angle 13 is 120° and the angle 14 between the inner lip 8 and the outer lip 9 is 150°. The inner lip 8 and the outer lip 9 converge at an obtuse angle into the inner protuberance lip 11 and the outer protuberance lip 12, respectively. In the embodiment shown in FIG. 4, the obtuse angle is approximately 170° and is larger than 150°. Finally, in the embodiment shown in FIG. 4, the area between the inner protuberance lip 11 and the outer protuberance lip 12 at the protuberance 10 is designed as a pimple-shaped projection 15.

Figure 3:
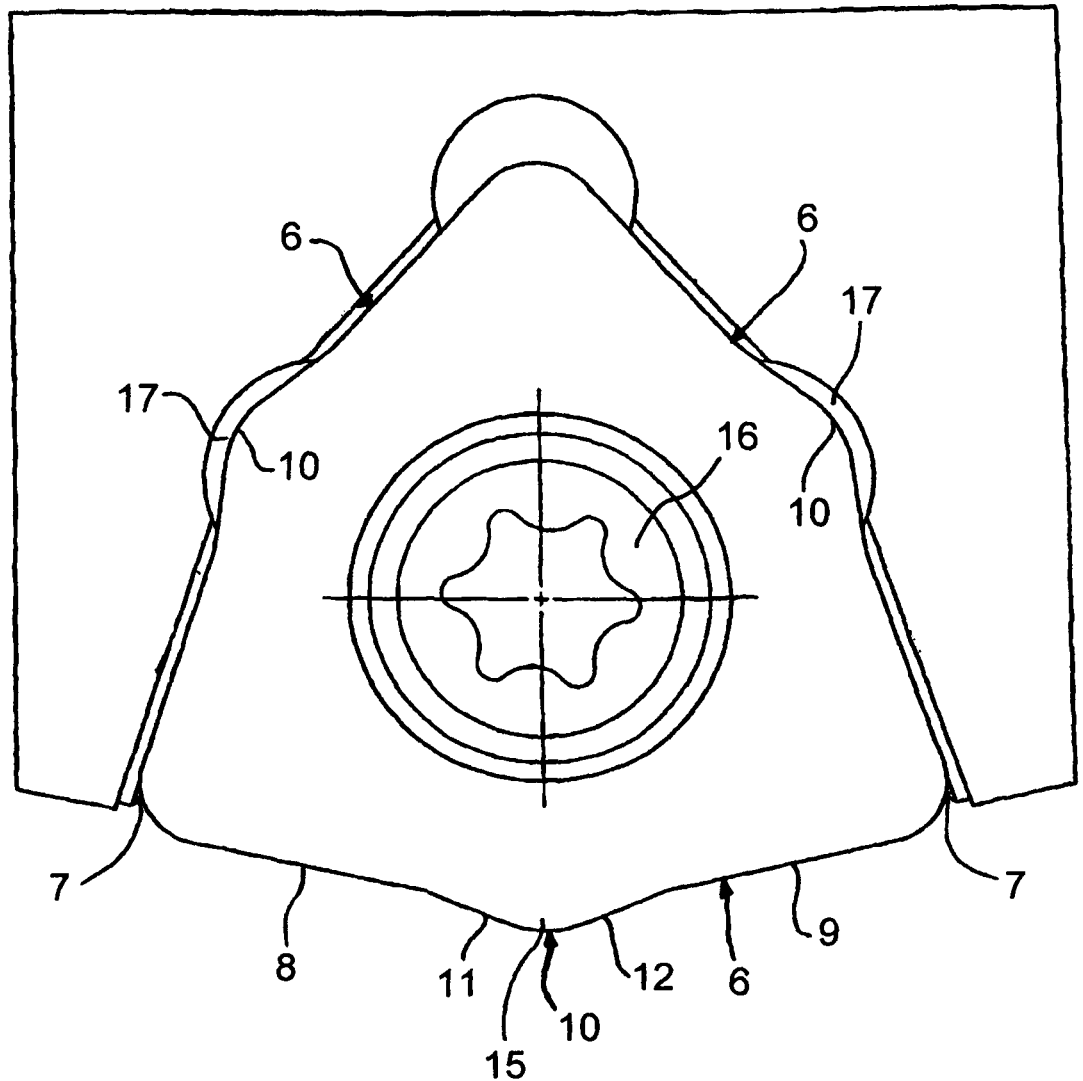
FIG. 3 is a top view of the indexable tip located in the insert seat.

In the drawings, one also sees a holding screw 16 for fixing the cutting insert 5 in the insert seat 4. Furthermore, one will recognize (FIG. 3) that the protuberances 10 of the inactive cutting edges 6 protrude into corner holes 17 in the area of the insert bearing faces 7, closing them at least in part. In this way, a filling of these corner holes 17 with chips is restricted or minimized.

One feature or aspect of an embodiment is believed at the time of the filing of this patent application to possibly reside broadly in a cutting insert for a drill 1 with at least one inner lip 8 and one outer lip 9, forming the sides of an angle 14 of an angular cutting edge 6, characterized in that a pimple-shaped protuberance 10 is provided at the vertex of the angle 14 and the lateral flanks of the protuberance 10 each form a protuberance lip 11, 12 directly running into the inner lip 8 and the outer lip 9, respectively.

Another feature or aspect of an embodiment is believed at the time of the filing of this patent application to possibly reside broadly in a cutting insert, characterized by an inner protuberance lip 11 running into the inner lip 8 and by an outer protuberance lip 12 running into the outer lip 9 in such a way that the interior angle 13 between the inner protuberance lip 11 and the outer protuberance lip 12 is smaller than the angle 14 between the inner lip 8 and the outer lip 9.

Yet another feature or aspect of an embodiment is believed at the time of the filing of this patent application to possibly reside broadly in a cutting insert, characterized by a vertex point of the interior angle 13 rounded as a pimple-shaped projection 15 between the inner protuberance lip 11 and the outer protuberance lip 12.

Still another feature or aspect of an embodiment is believed at the time of the filing of this patent application to possibly reside broadly in a cutting insert, characterized by a symmetric arrangement of the inner lip 8 and the outer lip 9 as well as of the inner protuberance lip 11 and the outer protuberance lip 12 relative to each other.

A further feature or aspect of an embodiment is believed at the time of the filing of this patent application to possibly reside broadly in a cutting insert, characterized in that the inner lip 8, the outer lip 9 as well as the inner protuberance lip 11 and the outer protuberance lip 12 are arranged symmetrically to the pimple-shaped projection 15.

Another feature or aspect of an embodiment is believed at the time of the filing of this patent application to possibly reside broadly in a cutting insert, characterized by an asymmetric arrangement of the cutting edges 8, 9, 11, 12 relative to each other, in such a way that during operation the arising cutting forces compensate each other.

Yet another feature or aspect of an embodiment is believed at the time of the filing of this patent application to possibly reside broadly in a cutting insert, characterized by a clearance in the area of the flank allocated to the protuberance 10.

Still another feature or aspect of an embodiment is believed at the time of the filing of this patent application to possibly reside broadly in a cutting insert as an indexable tip with two or several cutting edges 6.

A further feature or aspect of an embodiment is believed at the time of the filing of this patent application to possibly reside broadly in a cutting insert, characterized in that the cutting insert 5 configured as an indexable tip is arranged in the insert seat 4 of a drilling tool 1 such that at least one protuberance 10 of an inactive cutting edge 6 reaches, at least in part, into a corner hole 17 arranged between two insert bearing faces 7 of the insert seat 4.

Another feature or aspect of an embodiment is believed at the time of the filing of this patent application to possibly reside broadly in a drilling insert 1 with at least one inner lip 8 and one outer lip 9, forming the sides of an angle 14 of an angular cutting edge 6, which engages the workpiece during the drilling operation, characterized in that a centering point designed as a pimple-shaped protuberance 10 is provided at the vertex of the angle 14 and the lateral flanks of the protuberance 10 each form a protuberance lip 11, 12 directly running into the inner lip 8 and the outer lip 9, respectively.

Yet another feature or aspect of an embodiment is believed at the time of the filing of this patent application to possibly reside broadly in a drilling insert, characterized by an inner protuberance lip 11 running into the inner lip 8 and by an outer protuberance lip 12 running into the outer lip 9 in such a way that the interior angle 13 between the inner protuberance lip 11 and the outer protuberance lip 12 is smaller than the angle 14 between the inner lip 8 and the outer lip 9.

One feature or aspect of an embodiment is believed at the time of the filing of this patent application to possibly reside broadly in a drilling insert, characterized by a vertex point of the interior angle 13 rounded as a pimple-shaped projection 15 between the inner protuberance lip 11 and the outer protuberance lip 12.

Another feature or aspect of an embodiment is believed at the time of the filing of this patent application to possibly reside broadly in a drilling insert, characterized by a symmetric arrangement of the inner lip 8 and the outer lip 9 as well as of the inner protuberance lip 11 and the outer protuberance lip 12 relative to each other.

Yet another feature or aspect of an embodiment is believed at the time of the filing of this patent application to possibly reside broadly in a drilling insert, characterized in that the inner lip 8, the outer lip 9 as well as the inner protuberance lip 11 and the outer protuberance lip 12 are arranged symmetrically to the pimple-shaped projection 15.

Still another feature or aspect of an embodiment is believed at the time of the filing of this patent application to possibly reside broadly in a drilling insert, characterized by an asymmetric arrangement of the cutting edges 8, 9, 11, 12 relative to each other, in such a way that during operation the arising cutting forces compensate each other.

A further feature or aspect of an embodiment is believed at the time of the filing of this patent application to possibly reside broadly in a drilling insert, characterized by a clearance in the area of the flank allocated to the protuberance 10.

Another feature or aspect of an embodiment is believed at the time of the filing of this patent application to possibly reside broadly in a drilling insert according to any of the preceding claims as an indexable tip with two or several cutting edges 6.

Yet another feature or aspect of an embodiment is believed at the time of the filing of this patent application to possibly reside broadly in a drilling tool 1 with a drilling insert, the drilling insert 5 being arrange in an insert seat 4 in such a way that the pimple-shaped protuberance 10 is facing forwards as a centering point for the cutting edge 6.

Still another feature or aspect of an embodiment is believed at the time of the filing of this patent application to possibly reside broadly in a drilling tool 1, characterized in that the drilling insert 5 is configured as an indexable tip and is arranged in the insert seat 4 in such a way that at least one protuberance 10 of an inactive cutting edge 6 reaches, at least in part, into a corner hole 17 arranged between two insert bearing faces 7 of the insert seat 4.

The components disclosed in the various publications, disclosed or incorporated by reference herein, may possibly be used in possible embodiments of the present invention as well as equivalents thereof.

The purpose of the statements about the technical field is generally to enable the Patent and Trademark Office and the public to determine quickly, from a cursory inspection, the nature of this patent application. The description of the technical field is believed, at the time of the filing of this patent application, to adequately describe the technical field of this patent application. However, the description of the technical field may not be completely applicable to the claims as originally filed in this patent application, as amended during prosecution of this patent application, and as ultimately allowed in any patent issuing from this patent application. Therefore, any statements made relating to the technical field are not intended to limit the claims in any manner and should not be interpreted as limiting the claims in any manner.

The appended drawings in their entirety, including all dimensions, proportions and/or shapes in at least one embodiment of the invention, are accurate and are hereby included by reference into this specification.

The background information is believed, at the time of the filing of this patent application, to adequately provide background information for this patent application. However, the background information may not be completely applicable to the claims as originally filed in this patent application, as amended during prosecution of this patent application, and as ultimately allowed in any patent issuing from this patent application. Therefore, any statements made relating to the background information are not intended to limit the claims in any manner and should not be interpreted as limiting the claims in any manner.

All, or substantially all, of the components and methods of the various embodiments may be used with at least one embodiment or all of the embodiments, if more than one embodiment is described herein.

The purpose of the statements about the object or objects is generally to enable the Patent and Trademark Office and the public to determine quickly, from a cursory inspection, the nature of this patent application. The description of the object or objects is believed, at the time of the filing of this patent application, to adequately describe the object or objects of this patent application. However, the description of the object or objects may not be completely applicable to the claims as originally filed in this patent application, as amended during prosecution of this patent application, and as ultimately allowed in any patent issuing from this patent application. Therefore, any statements made relating to the object or objects are not intended to limit the claims in any manner and should not be interpreted as limiting the claims in any manner.

All of the patents, patent applications and publications recited herein, and in the Declaration attached hereto, are hereby incorporated by reference as if set forth in their entirety herein.

The summary is believed, at the time of the filing of this patent application, to adequately summarize this patent application. However, portions or all of the information contained in the summary may not be completely applicable to the claims as originally filed in this patent application, as amended during prosecution of this patent application, and as ultimately allowed in any patent issuing from this patent application. Therefore, any statements made relating to the summary are not intended to limit the claims in any manner and should not be interpreted as limiting the claims in any manner.

It will be understood that any or all the examples of patents, published patent applications, and other documents which are included in this application and including those which are referred to in paragraphs which state "Some examples of . . . which may possibly be used in at least one possible embodiment of the present application . . . " may possibly not be used or useable in any one or more or any embodiments of the application.

The sentence immediately above relates to patents, published patent applications and other documents either incorporated by reference or not incorporated by reference.

All of the patents, patent applications or patent publications, which were cited in the International Search Report dated Jun. 26, 2007, and/or cited elsewhere are hereby incorporated by reference as if set forth in their entirety herein as follows: EP 0 133 168; U.S. Pat. Nos. 4,572,042; 4,297,058; GB 2 016 316.

The purpose of incorporating U.S. patents, Foreign patents, publications, etc. is solely to provide additional information relating to features of one or more embodiments, which information may not be completely disclosed in the wording in the pages of this application.

The corresponding foreign and international patent publication applications, namely, Federal Republic of Germany Patent Application No. 10 2006 010 856.6, filed on Mar. 9, 2006, having inventors Peter Karl MERGENTHALER; Berthold Heinrich ZEUG; and Horst Manfred JAEGER, and DE-OS 10 2006 010 856.6 and DE-PS 10 2006 010 856.6, and International Application No. PCT/EP2007/001798, filed on Mar. 2, 2007, having WIPO Publication No. WO 2007/101615 and inventors Peter Karl MERGENTHALER; Berthold Heinrich ZEUG; and Horst Manfred JAEGER, are hereby incorporated by reference as if set forth in their entirety herein for the purpose of correcting and explaining any possible misinterpretations of the English translation thereof. In addition, the published equivalents of the above corresponding foreign and international patent publication applications, and other equivalents or corresponding applications, if any, in corresponding cases in the Federal Republic of Germany and elsewhere, and the references and documents cited in any of the documents cited herein, such as the patents, patent applications and publications, are hereby incorporated by reference as if set forth in their entirety herein.

Other statements relating to opinions, evaluations, including such wording as all, always, absolutely, consistently, preferably, guarantee, particularly, constantly, ensure, necessarily, immediately, endlessly, avoid, exactly, continually, expediently, need, must, only, perpetual, precise, perfect, require, requisite, simultaneous, total, unavoidable, and unnecessary, or words substantially equivalent to the above-mentioned word in this sentence. The purpose of incorporating the Foreign equivalent patent application PCT/EP2007/001798 and German Patent Application 10 2006 010 856.6 is solely for the purpose of providing a basis of correction of any wording in the pages of the present application, which may have been mistranslated or misinterpreted by the translator. Words relating to opinions and judgments of the author and not directly relating to the technical details of the description of the embodiments therein are not to be incorporated by reference. The words all, always, absolutely, consistently, preferably, guarantee, particularly, constantly, ensure, necessarily, immediately, endlessly, avoid, exactly, continually, expediently, need, must, only, perpetual, precise, perfect, require, requisite, simultaneous, total, unavoidable, and unnecessary, or words substantially equivalent to the above-mentioned word in this sentence, are not generally considered to be incorporated by reference.

Statements made in the original foreign patent applications PCT/EP2007/001798 and DE 10 2006 010 856.6 from which this patent application claims priority which do not have to do with the correction of the translation in this patent application are not to be included in this patent application in the incorporation by reference.

All of the references and documents, cited in any of the documents cited herein, are hereby incorporated by reference as if set forth in their entirety herein. All of the documents cited herein, referred to in the immediately preceding sentence, include all of the patents, patent applications and publications cited anywhere in the present application.

The description of the embodiment or embodiments is believed, at the time of the filing of this patent application, to adequately describe the embodiment or embodiments of this patent application. However, portions of the description of the embodiment or embodiments may not be completely applicable to the claims as originally filed in this patent application, as amended during prosecution of this patent application, and as ultimately allowed in any patent issuing from this patent application. Therefore, any statements made relating to the embodiment or embodiments are not intended to limit the claims in any manner and should not be interpreted as limiting the claims in any manner.

The details in the patents, patent applications and publications may be considered to be incorporable, at applicant's option, into the claims during prosecution as further limitations in the claims to patentably distinguish any amended claims from any applied prior art.

The purpose of the title of this patent application is generally to enable the Patent and Trademark Office and the public to determine quickly, from a cursory inspection, the nature of this patent application. The title is believed, at the time of the filing of this patent application, to adequately reflect the general nature of this patent application. However, the title may not be completely applicable to the technical field, the object or objects, the summary, the description of the embodiment or embodiments, and the claims as originally filed in this patent application, as amended during prosecution of this patent application, and as ultimately allowed in any patent issuing from this patent application. Therefore, the title is not intended to limit the claims in any manner and should not be interpreted as limiting the claims in any manner.

The abstract of the disclosure is submitted herewith as required by 37 C.F.R. §1.72(b). As stated in 37 C.F.R. §1.72(b):

A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims.

Therefore, any statements made relating to the abstract are not intended to limit the claims in any manner and should not be interpreted as limiting the claims in any manner.

The embodiments of the invention described herein above in the context of the preferred embodiments are not to be taken as limiting the embodiments of the invention to all of the provided details thereof, since modifications and variations thereof may be made without departing from the spirit and scope of the embodiments of the invention.

What is claimed is:

1. A drill for drilling a hole in an object, said drill having a central longitudinal axis, said drill comprising:

a shank portion being configured to be gripped by a tool;
a fluted portion comprising two chip flutes and a tip;
an inner cutting insert and an outer cutting insert;
said inner cutting insert being disposed at said tip adjacent the central longitudinal axis of said drill;
said outer cutting insert being disposed at said tip adjacent the periphery of the drill a distance from the central longitudinal axis of said drill;
said inner cutting insert being configured and disposed to cut a central portion of a hole;
said outer cutting insert being configured and disposed to cut an outer portion and side wall of a hole;
said outer cutting insert comprising a cutting edge which is straight;
said inner cutting insert comprising a central body portion and at least one angular cutting edge disposed on the periphery of said central body portion;
said angular cutting edge comprising an inner lip and an outer lip being disposed at an angle with respect to one another, wherein a line extending along and from said inner lip intersects with a line extending along and from said outer lip at the vertex of the angle;
said inner lip being disposed closer to the central longitudinal axis of said drill than said outer lip;
said angular cutting edge comprising a protuberance being disposed between and connecting said inner lip and said outer lip;
said protuberance being disposed to project outwardly away from said central body portion beyond the vertex of the angle defined by the intersection of the lines extending from said inner lip and said outer lip;
said protuberance being configured and disposed to compensate for radial forces acting on said drill during drilling to minimize radial drifting of said drill; said protuberance comprising an inner lip and an outer lip; said inner lip of said protuberance being connected to said inner lip of said cutting edge and forming a smooth curvilinear transition between said inner lip of said protuberance and said inner lip of said cutting edge; and said outer lip of said protuberance being connected to said outer lip of said cutting edge and forming a smooth curvilinear transition between said outer lip of said protuberance and said outer lip of said cutting edge, wherein:

said inner protuberance lip and said outer protuberance lip are disposed at an angle with respect to one another, which angle is smaller than the angle defined by said inner lip and said outer lip;

said protuberance comprises a convex, rounded tip portion disposed between and connecting said inner protuberance lip and said outer protuberance lip;

one of (A) and (B):

(A) said inner lip and said outer lip are symmetric with respect to one another about said rounded tip portion; and said inner protuberance lip and said outer protuberance lip are symmetric with respect to one another about said rounded tip portion; and (B) said inner lip and said outer lip are asymmetric with respect to one another about said rounded tip portion, and said inner protuberance lip and said outer protuberance lip are asymmetric with respect to one another about said rounded tip portion, in order to compensate for radial forces acting on said drill during drilling to minimize radial drifting of said drill;

said cutting insert comprises a flank surface disposed along said cutting edge;

said flank surface comprises a clearance area disposed adjacent to said protuberance;

said cutting insert comprises an indexable insert comprising at least two cutting edges;

said cutting insert is seated in an insert seat in said drill;

said insert seat comprises a corner hole disposed between two insert bearing faces; and said protuberance of an inactive cutting edge is inserted into said corner hole to center said cutting insert in said insert seat and to fill said corner hole to prevent entry of chips into said corner hole during drilling.

2. A drilling insert for use on a drill comprising:

a central body portion and at least one angular cutting edge disposed on the periphery of said central body portion;

said angular cutting edge comprising an inner lip and an outer lip being disposed at an angle with respect to one another, wherein a line extending along and from said inner lip intersects with a line extending along and from said outer lip at the vertex of the angle; usaid inner lip being structured to be disposed closer to the central longitudinal axis of said drill than said outer lip;

said angular cutting edge comprising a protuberance being disposed between and connecting said inner lip and said outer lip;

said protuberance being disposed to project outwardly away from said central body portion beyond the vertex of the angle defined by the intersection of the lines extending from said inner lip and said outer lip;

said protuberance being configured and disposed to compensate for radial forces acting on said drill during drilling to minimize radial drifting of said drill;

said protuberance comprising an inner lip and an outer lip;

said inner lip of said protuberance being connected to said inner lip of said cutting edge and forming a smooth curvilinear transition between said inner lip of said protuberance and said inner lip of said cutting edge; and said outer lip of said protuberance being connected to said outer lip of said cutting edge and forming a smooth curvilinear transition between said outer lip of said protuberance and said outer lip of said cutting edge, wherein:

said inner protuberance lip and said outer protuberance lip are disposed at an angle with respect to one another, which angle is smaller than the angle defined by said inner lip and said outer lip; and said protuberance comprises a convex, rounded tip portion disposed between and connecting said inner protuberance lip and said outer protuberance lip.

3. The drilling insert according to claim 2, wherein one of (A) and (B):

(A) said inner lip and said outer lip are symmetric with respect to one another about said rounded tip portion; and said inner protuberance lip and said outer protuberance lip are symmetric with respect to one another about said rounded tip portion; and (B) said inner lip and said outer lip are asymmetric with respect to one another about said rounded tip portion, and said inner protuberance lip and said outer protuberance lip are asymmetric with respect to one another about said rounded tip portion, in order to compensate for radial forces acting on said drill during drilling to minimize radial drifting of said drill.

4. The drilling insert according to claim 3, wherein:

said drilling insert comprises a flank surface disposed along said cutting edge;

said flank surface comprises a clearance area disposed adjacent to said protuberance;

said drilling insert comprises an indexable insert comprising at least two cutting edges;

said drilling insert is configured to be seated in an insert seat in a drill; and said protuberance of an inactive cutting edge is configured to be inserted into a corner hole between two insert bearing faces of an insert seat in a drill to center said drilling insert in the insert seat and to fill the corner hole to prevent entry of chips into the corner hole during drilling.

5. A drill comprising a shank portion, a fluted portion, and a cutting insert, said cutting insert comprising:

a central body portion and at least one angular cutting edge disposed on the periphery of said central body portion;

said angular cutting edge comprising an inner lip and an outer lip being disposed at an angle with respect to one another, wherein a line extending along and from said inner lip intersects with a line extending along and from said outer lip at the vertex of the angle;

said inner lip being disposed closer to a central longitudinal axis of said drill than said outer lip;

said angular cutting edge comprising a protuberance being disposed between and connecting said inner lip and said outer lip;

said protuberance being disposed to project outwardly away from said central body portion beyond the vertex of the angle defined by the intersection of the lines extending from said inner lip and said outer lip;

said protuberance is configured and disposed to compensate for radial forces acting on said drill during drilling to minimize radial drifting of said drill;

said protuberance comprises an inner lip and an outer lip;

said inner lip of said protuberance is connected to said inner lip of said cutting edge and forming a smooth curvilinear transition between said inner lip of said protuberance and said inner lip of said cutting edge; and said outer lip of said protuberance is connected to said outer lip of said cutting edge and forming a smooth curvilinear transition between said outer lip of said protuberance and said outer lip of said cutting edge, wherein: said inner protuberance lip and said outer protuberance lip are disposed at an angle with respect to one another, which angle is smaller than the angle defined by said inner lip and said outer lip; and said protuberance comprises a convex, rounded tip portion disposed between and connecting said inner protuberance lip and said outer protuberance lip.

6. The drill according to claim 5, wherein one of (A) and (B):
   (A) said inner lip and said outer lip are symmetric with respect to one another about said rounded tip portion; and
   said inner protuberance lip and said outer protuberance lip are symmetric with respect to one another about said rounded tip portion; and
   (B) said inner lip and said outer lip are asymmetric with respect to one another about said rounded tip portion, and said inner protuberance lip and said outer protuberance lip are asymmetric with respect to one another about said rounded tip portion, in order to compensate for radial forces acting on said drill during drilling to minimize radial drifting of said drill.

7. The drill according to claim 6, wherein:
   said cutting insert comprises a flank surface disposed along said cutting edge;
   said flank surface comprises a clearance area disposed adjacent to said protuberance;
   said cutting insert comprises an indexable insert comprising at least two cutting edges;
   said cutting insert is seated in an insert seat in said drill;
   said insert seat comprises a corner hole disposed between two insert bearing faces; and
   said protuberance of an inactive cutting edge is inserted into said corner hole to center said cutting insert in said insert seat and to fill said corner hole to prevent entry of chips into said corner hole during drilling.

8. A method of drilling a hole in workpiece using a drill comprising a shank portion, a fluted portion, and a cutting insert, said cutting insert comprising:
   a central body portion and at least one angular cutting edge disposed on the periphery of said central body portion; said angular cutting edge comprising an inner lip and an outer lip being disposed at an angle with respect to one another, wherein a line extending along and from said inner lip intersects with a line extending along and from said outer lip at the vertex of the angle; said inner lip being disposed closer to a central longitudinal axis of said drill than said outer lip; said angular cutting edge comprising a protuberance being disposed between and connecting said inner lip and said outer lip; and said protuberance being disposed to project outwardly away from said central body portion beyond the vertex of the angle defined by the intersection of the lines extending from said inner lip and said outer lip; said protuberance comprising an inner lip and an outer lip; said inner lip of said protuberance is connected to said inner lip of said cutting edge and forming a smooth curvilinear transition between said inner lip of said protuberance and said inner lip of said cutting edge; said outer lip of said protuberance is connected to said outer lip of said cutting edge and forming a smooth curvilinear transition between said outer lip of said protuberance and said outer lip of said cutting edge; said inner protuberance lip and said outer protuberance lip are disposed at an angle with respect to one another, which angle is smaller than the angle defined by said inner lip and said outer lip; and said protuberance comprises a convex, rounded tip portion disposed between and connecting said inner protuberance lip and said outer protuberance lip, said method comprising the steps of:
   disposing said cutting insert adjacent the central longitudinal axis of said drill to permit said cutting insert to cut a central portion of a hole;
   drilling into a workpiece with said cutting insert; and
   compensating for radial forces acting on said drill during drilling with said protuberance to minimize radial drifting of said drill.

9. The method according to claim 8, wherein:
   one of (A) and (B):
   (A) said inner lip and said outer lip are symmetric with respect to one another about said rounded tip portion; and
   said inner protuberance lip and said outer protuberance lip are symmetric with respect to one another about said rounded tip portion; and
   (B) said inner lip and said outer lip are asymmetric with respect to one another about said rounded tip portion, and said inner protuberance lip and said outer protuberance lip are asymmetric with respect to one another about said rounded tip portion, in order to compensate for radial forces acting on said drill during drilling to minimize radial drifting of said drill;
   said cutting insert comprises a flank surface disposed along said cutting edge;
   said flank surface comprises a clearance area disposed adjacent to said protuberance;
   said cutting insert comprises an indexable insert comprising at least two cutting edges;
   said cutting insert is seated in an insert seat in said drill;
   said insert seat comprises a corner hole disposed between two insert bearing faces; and
   said protuberance of an inactive cutting edge is inserted into said corner hole to center said cutting insert in said insert seat and to fill said corner hole to prevent entry of chips into said corner hole during drilling.

10. A drilling insert for drilling a hole, the drilling insert comprising:
    a central body portion and at least one angular cutting edge disposed on the periphery of said central body portion;
    said angular cutting edge comprising an inner lip and an outer lip being disposed at an angle with respect to one another, wherein a line extending along and from said inner lip intersects with a line extending along and from said outer lip at the vertex of the angle;
    said angular cutting edge comprising a protuberance being disposed between and connecting said inner lip and said outer lip;
    said protuberance being disposed to project outwardly away from said central body portion beyond the vertex of the angle defined by the intersection of the lines extending from said inner lip and said outer lip;
    said protuberance comprising an inner lip and an outer lip;
    said inner lip of said protuberance being connected to said inner lip of said cutting edge and forming a smooth curvilinear transition between said inner lip of said protuberance and said inner lip of said cutting edge; and
    said outer lip of said protuberance being connected to said outer lip of said cutting edge and forming a smooth curvilinear transition between said outer lip of said protuberance and said outer lip of said cutting edge, wherein:
said inner protuberance lip and said outer protuberance lip are disposed at an angle with respect to one another, which angle is smaller than the angle defined by said inner lip and said outer lip; and
said protuberance comprises a convex, rounded tip portion disposed between and connecting said inner protuberance lip and said outer protuberance lip.

11. The drilling insert according to claim 10, wherein one of (A) and (B):
(A) said inner lip and said outer lip are symmetric with respect to one another about said rounded tip portion; and
said inner protuberance lip and said outer protuberance lip are symmetric with respect to one another about said rounded tip portion; and
(B) said inner lip and said outer lip are asymmetric with respect to one another about said rounded tip portion, and said inner protuberance lip and said outer protuberance lip are asymmetric with respect to one another about said rounded tip portion, in order to compensate for radial forces acting on said drill during drilling to minimize radial drifting of said drill.

12. The drilling insert according to claim 11, wherein:
said drilling insert comprises a flank surface disposed along said cutting edge;
said flank surface comprises a clearance area disposed adjacent to said protuberance; and
said drilling insert comprises an indexable insert comprising at least two cutting edges.

13. The drilling insert according to claim 12, wherein:
said drilling insert is configured to be seated in an insert seat in a drill; and
said protuberance of an inactive cutting edge is configured to be inserted into a corner hole between two insert bearing faces of an insert seat in a drill to center said drilling insert in the insert seat and to fill the corner hole to prevent entry of chips into the corner hole during drilling.

* * * * *